US009660927B2

(12) United States Patent
Akl-Chedid et al.

(10) Patent No.: US 9,660,927 B2
(45) Date of Patent: May 23, 2017

(54) PREEMPTIVE PACKET TRANSMISSION

(71) Applicant: Accedian Networks Inc., St-Laurent (CA)

(72) Inventors: Ziad Akl-Chedid, Montreal (CA); Claude Robitaille, St-Placide (CA)

(73) Assignee: Accedian Networks Inc., Saint-Laurent (CA)

( * ) Notice: Subject to any disclaimer, the term of this patent is extended or adjusted under 35 U.S.C. 154(b) by 99 days.

(21) Appl. No.: 14/693,069

(22) Filed: Apr. 22, 2015

(65) Prior Publication Data

US 2016/0315870 A1 Oct. 27, 2016

(51) Int. Cl.
*H04L 12/869* (2013.01)
*H04L 12/863* (2013.01)
*H04L 12/851* (2013.01)
*H04L 12/841* (2013.01)

(52) U.S. Cl.
CPC .......... *H04L 47/622* (2013.01); *H04L 47/245* (2013.01); *H04L 47/28* (2013.01)

(58) Field of Classification Search
None
See application file for complete search history.

(56) References Cited

U.S. PATENT DOCUMENTS

| 6,754,179 | B1 * | 6/2004 | Lin ....................... H04L 1/1803 370/235 |
| 8,571,071 | B2 * | 10/2013 | Dominguez Romero ............ H04W 72/1242 370/235 |
| 2006/0109864 | A1 * | 5/2006 | Oksman .................. H04L 7/041 370/474 |
| 2008/0259927 | A1 * | 10/2008 | Evans ................... H04L 1/0045 370/394 |
| 2011/0142052 | A1 * | 6/2011 | Kulkarni ............... H04L 47/245 370/392 |
| 2014/0067994 | A1 * | 3/2014 | Puttaswamy Naga ................... H04L 41/0896 709/217 |
| 2015/0163014 | A1 * | 6/2015 | Birrittella ............. H04L 1/0045 714/807 |

* cited by examiner

*Primary Examiner* — Chi H Pham
*Assistant Examiner* — Soon-Dong D Hyun
(74) *Attorney, Agent, or Firm* — Nixon Peabody LLP

(57) ABSTRACT

Disclosed herein is technology to reduce latency of frames through a network device supporting various priorities. In an implementation, a method comprises configuring one or more priorities with a preemptive right over other one or more of said plurality of priorities; receiving frames in a sequence, each of the frames having a frame priority comprising of one of said plurality of priorities; queuing the received frames in a predetermined order based on a frame arrival time and the frame priority; transmitting a current frame based on a current frame priority and current frame arrival time; stopping transmission of the current frame when a later frame in the sequence is received that has a later frame priority with preemptive right over the current frame priority; transmitting an invalid frame check sequence; transmitting the later frame; and restarting the transmission of the current frame after transmitting the later frame.

20 Claims, 6 Drawing Sheets

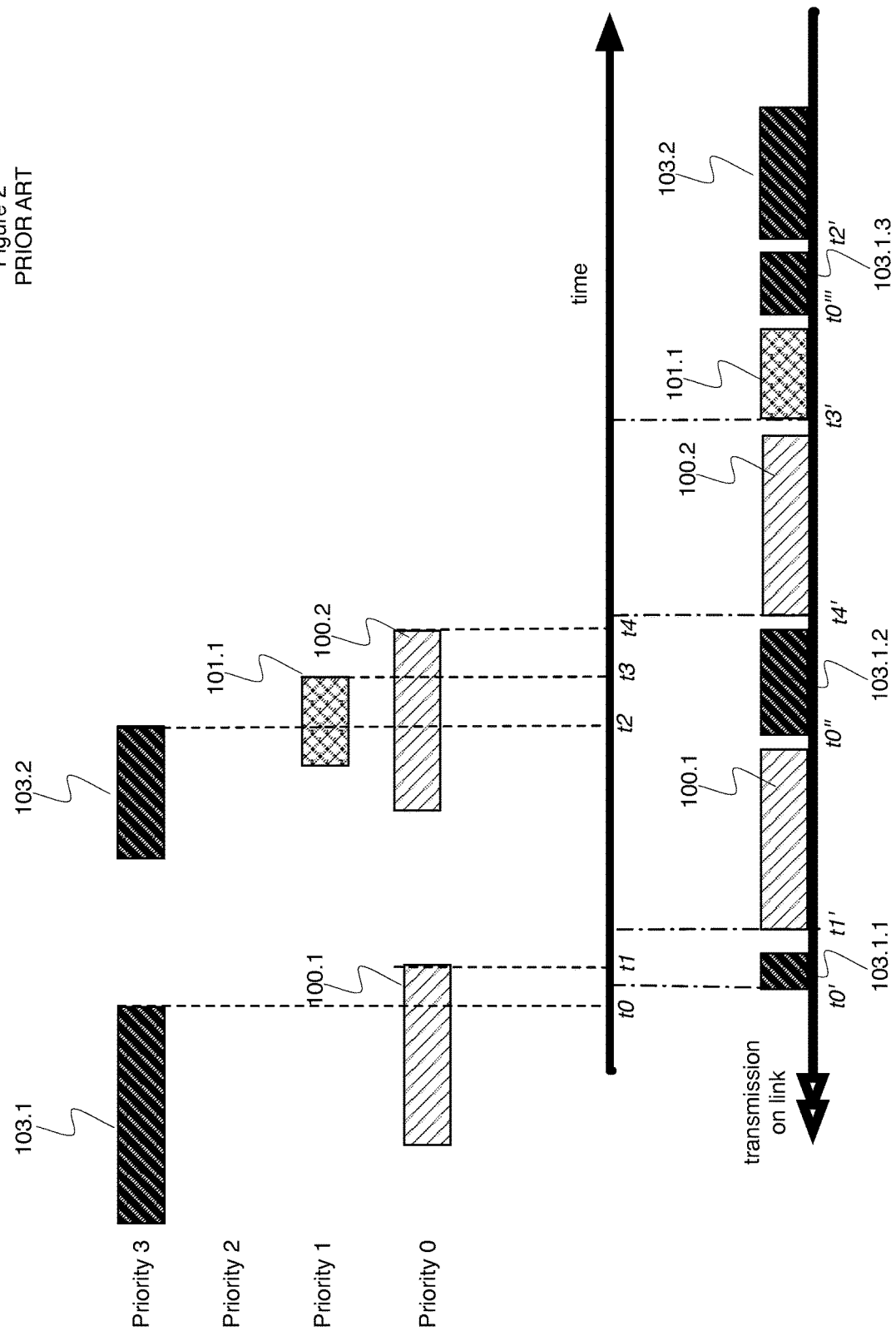

PREEMPTIVE PACKET TRANSMISSION

TECHNICAL FIELD

The present disclosure relates to low latency transmission over packet networks.

OVERVIEW

Disclosed herein is technology to reduce latency of frames through a network device supporting various priorities. In an implementation, a method comprises configuring one or more priorities with a preemptive right over other one or more of said plurality of priorities; receiving frames in a sequence, each of the frames having a frame priority comprising of one of said plurality of priorities; queuing the received frames in a predetermined order based on a frame arrival time and the frame priority; transmitting a current frame based on a current frame priority and current frame arrival time; stopping transmission of the current frame when a later frame in the sequence is received that has a later frame priority with preemptive right over the current frame priority; transmitting an invalid frame check sequence; transmitting the later frame; and restarting the transmission of the current frame after transmitting the later frame.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

The foregoing and other advantages of the disclosure will become apparent upon reading the following detailed description and upon reference to the drawings.

FIG. 2 is an example of a suspended transmission for low latency packet scheduling.

TECHNICAL DISCLOSURE

Figure 1:
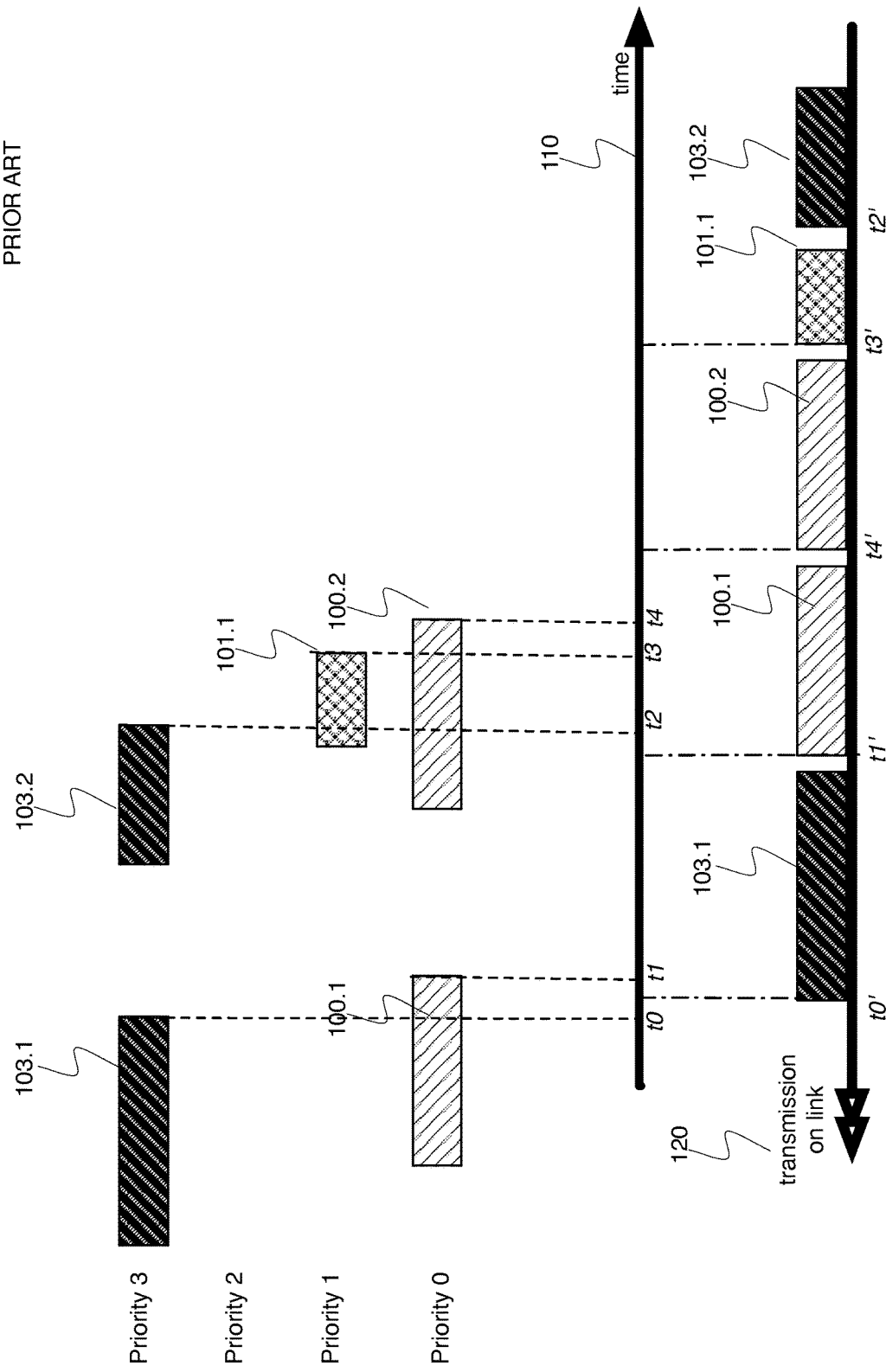
FIG. 1 is an example of prior art scheduling of low latency packets.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

Figure 1A:
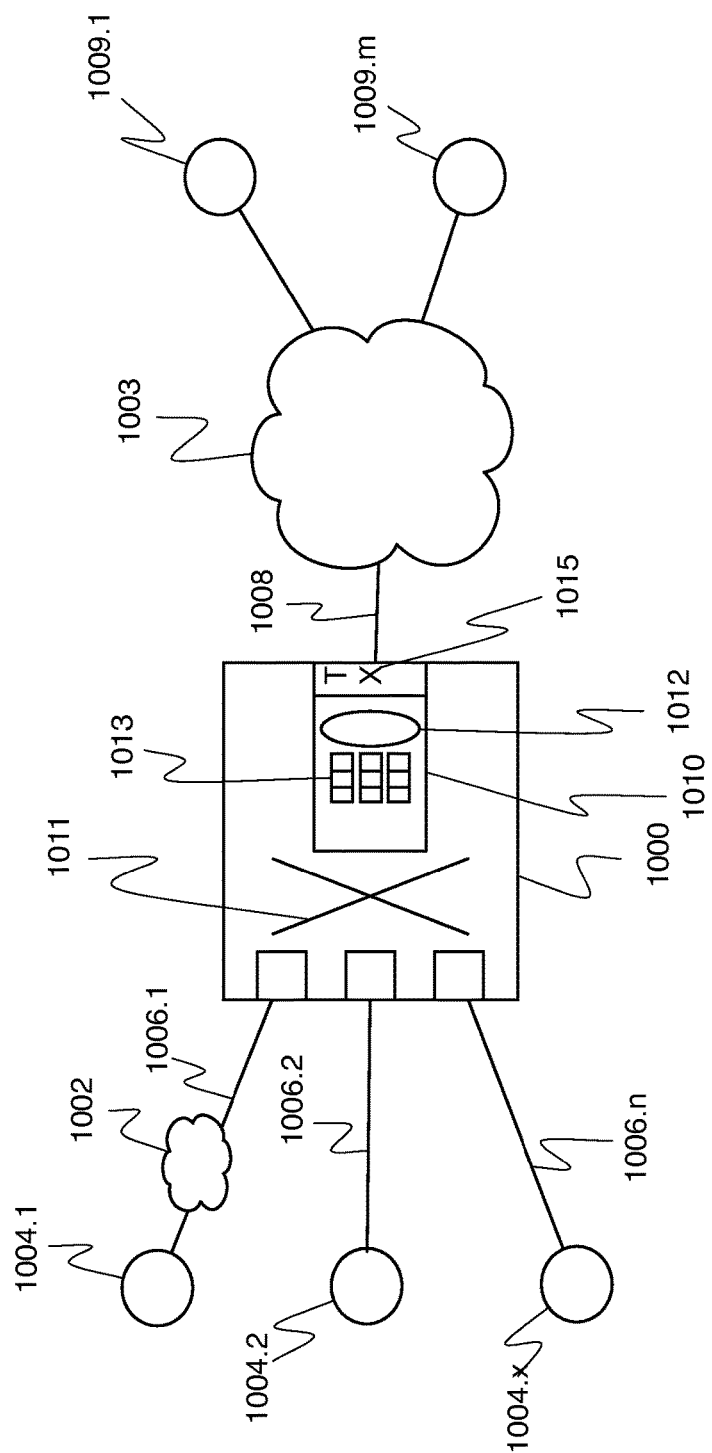
FIG. 1a is an example of a network with a network device supporting a plurality of priorities.

Referring to FIG. 1a, a network device 1000 generally comprises a plurality of ingress links 1006.1, 1006.2 . . . 1006.n, and a plurality of egress links 1008 (only one is shown for simplification). A network device can be a router, a switch, a network Interface Device, a Network Interface Card etc. Devices or applications 1004.1, 1004.2 . . . 1004.n generating packets are connected to the ingress links 1006.1, 1006.2 . . . 1006.n either directly or via one or more network 1002. The packets are generally switched 1011 to one or more of the egress links 1008 (depending on the protocol and configuration) in order to reach their destination application or devices 1009.1 . . . 1009.m directly or via one or more network 1003. Applications or devices 1004.1, 1004.2 . . . 1004.n, 1009.1 . . . 1009.m can be a variety of different types of devices communicating over a network, such as a server computer, desktop computer, a netbook or laptop computer, a notepad or tablet computer, a mobile station, an entertainment appliance, a set-top box communicatively coupled to a display device, a television, a cellular or other wireless phone, a game console, an automotive computer, a router, a gateway, and so forth. The devices can execute one or more applications generating a plurality of frames with different performance expectations from the network.

Generally most networking device require combining flows of packets from different ingress links (or ports) onto one egress link with typical speed mismatch which implies that packets need to be queued at the egress port 1010 before being transmitted 1015 on the egress link 1008. Packets awaiting transmission on an egress link are queued (e.g. stored in memory in an ordered list) in order of arrival in one of possibly a plurality of queues 1013 based on a predetermined class of service (CoS), Quality of Service (QoS), rules, policies, or other means to classify the packet in priority order that are known in the art. The packets are extracted from the queue 1013 by a scheduling mechanism 1012 when it is time to transmit it on the egress link 1008. For the description herein, the concept of priority is used generically wherein a packet is given one priority level based on one or more of the above criteria. Some applications (e.g. financial transactions, voice packets) require that the packets are subject to very low latency and low variance on the latency to reach the destination. The low latency packets are generally small and of similar size. Other applications (e.g. data transfer, web downloads) have much less stringent requirements on the delay and typically support retransmission protocols or other protocols to deal with latency at the destination. Typically packets used for data transfers and lower priority applications are generally of a larger size and the size can be very variable. For simplification, it is assumed that priority 0 is the highest priority reserved for low latency packets and the priority of the packets lowers with a higher priority number. There exist several known architectures and algorithms for organizing queues of packets and scheduling the transmission of the packets in an appropriate order based on their priority.

The latency experienced by a specific packet, belonging to a particular flow, transiting through the device is generally subject to statistical variations. The latency variations are in most part a product of ingress conditions (e.g. arrival time of frames from different flows), functional processing (e.g. network functionalities performed by the appliance, competition of different flows for the same functionality, etc.), and mostly because of egress conditions (e.g. amount of flows competing for the transmission resources, the queuing and scheduling algorithms used, speed of the egress link, etc.).

In many network deployments (e.g. financial markets, Data Center access), overall transit latency is a key performance indicator for a plurality of flows and minimizing latency end-to-end is required.

For these targeted network deployments, optimal latency is such a preoccupation that the physical link is deliberately severely under-subscribed to insure higher transfer rates and minimal impact from resource contention.

Additionally, for these types of networks, it is imperative to maintain an accurate clocking scheme for testing purposes.

Existing queuing and scheduling algorithm (e.g. strict priority queuing) selects the next packet to be transmitted from the highest priority queue that has a frame awaiting transmission. The highest priority frames is generally transmitted before any lower priority frames as soon as soon as the link is available. However, when a packet of higher priority arrives in the queue while a lower priority packet is being transmitted, the higher priority packet waits until the completion of the transmission before being transmitted. In general, lower priority packets are larger, therefore the waiting time may be significant and highly variable. The wait increases the latency often beyond acceptable objectives. This issue is more acute when the packet has to go through several nodes before reaching destination.

FIG. 1b shows an example of a priority queuing as known in the art. Frames of different priorities arrive at a queuing system at random arrival times. The timeline 110 shows the arrival times of the frames. At t0, frame 103.1 of priority 3 arrives, at time t1 a frame 100.1 of priority 1 arrives, following at time t2 of frame 103.2 of priority 3. At time t3 a frame 101.1 of priority 1 arrives followed by a frame 100.2 of priority 0 at time t4. Since the link is idle, frame 103.1 is transmitted on the link 120 at time t0', where $\delta=t0'-t0$ includes the frame processing time, inter-frame gap requirement, preamble and start of frame delimiter (SFD) transmission etc. Frame 100.1 of priority 1 arrives during the transmission of the frame of priority 3, and must wait until the transmission is completed before it is processed and transmitted at t1'.

The time $\alpha=t1'-t1-\delta$ represents the additional latency applied to the low-latency priority 0 frame while waiting for the transmission of the lower priority frame to complete. Since the second frame of priority 0 arrives while the first one 100.1 is being transmitted, it is scheduled next for transmission as it is higher priority, even if frames 103.2 and 101.1 arrived during that period. The time $\alpha_4=t4'-t4-\delta$ represents the latency of the frame 100.2 excluding the fixed delays, which is due to waiting in turn behind a frame of the same priority. Frame 101.1 of priority 1 is then transmitted at time t3' followed by frame 103.2 at time t2'.

As can be seen with this example, the latency for the priority 0 frames varies a lot and is influenced by the pattern of arrival of frames of any priorities.

In patent application US 2011/0261814 and in the standard specification 802.Qbu from the Institute of Electrical and Electronics Engineers (IEEE), a scheme is disclosed to improve the latency of high priority frames by suspending the transmission of a lower priority packet and then continuing the transmission from where it stopped when the high priority frame is transmitted. This method guarantees a minimum latency through the network device, by pausing transmission of an low priority frame in order to free up transmission resources for a frame belonging to a higher priority flow. However, this results in the fragmentation of lower priority flows.

FIG. 2 shows the same example as FIG. 1 but where frames are transmitted with the scheme disclosed in US 2011/0261814. Frames of different priorities arrive at a queuing system at random arrival times. The timeline 110 shows the arrival times of the frames. At t0, frame 103.1 of priority 3 arrives, at time t1 a frame of priority 1 100.1 arrives, following at time t2 of frame 103.2 or priority 3. At time t3 a frame 101.1 of priority 1 arrives followed by a frame 100.2 of priority 0 at time t4. Since the link is idle, frame 103.1 is transmitted on the link 120 at time t0', where $\delta=t0'-t0$ is the frame processing time, inter-frame gap requirement, preamble and start of frame delimiter (SFD) transmission etc. Frame 100.1 arrives during the transmission of the frame of priority 3, transmission of frame 103.1.1 is preempted to transmit frame 100.1 immediately after processing.

The time $\alpha=t1'-t1-\delta-\xi$ represents the additional latency applied to the low-latency priority 0 frame which includes the processing time $\delta$ and the time $\xi$ it takes to preempt the transmission of frame 103.1. When the priority 0 frame 100.1 transmission is completed, the transmission of the preempted frame 103.1.2 continues since no other frames of higher priority have arrived. At time t3, frame of priority 1 101.1 arrives but priority 1 does not have preemptive priority over priority 3, therefore it is queued. When priority 0 frame 100.2 arrives, it preempts the transmission of frame 103.1.2 again. The priority 0 frame 100.2 is transmitted immediately after preemption and processing delays. Before restarting the transmission of the remainder of the priority 3 frame 103.1.3, the frame of priority 1 101.1 waiting in queue is scheduled. After the remainder of the frame 103.1.3 is transmitted the priority 3 frame 103.2 which arrived at time t2 now waiting in queue is then transmitted.

This method requires that devices at both end of the layer 2 network conform to the same functionality to interpret and correct the effect of the fragmentation. Therefore, in order to take advantage of this solution, a network operator is expected to redesign a sizable part of the network.

Moreover, this method is not compatible with layer 3 (or above) forwarding hops (routers, layer3/4 switches, etc.) because fragmentation is not supported at that layer.

This method is not amenable to protocols requiring accurate timestamping. This solution guarantees minimal latency by suspending the ongoing transmission of lower priority frame to transmit a higher priority one. Once the higher priority frame is transmitted, the remainder of the lower priority frame is then transmitted. If the lower priority frame required time-stamping, it will most likely be done during the transmission of the first segment, which would not have been accurate since the true time-stamp should reflect the transmission time of the last fragment of the frame.

It is a technical advantage to minimize or reduce device latency contribution by reducing egress latency of one or more low latency flows resulting from the confluence of a plurality of flows requiring different performance objectives. It is also at technical advantage to maintain an accurate clocking scheme for synchronization purpose.

Maintaining minimal transit latency is achieved by designating a specific flow as being latency sensitive critical flow (highest priority flow). This critical flow is given precedence over other flows by being allowed to interrupt the frame transmission of those of lesser priority (non-critical) flows, hence the designation of preempted transmission.

In one embodiment, the different priorities supported by the network device are configured to have preemptive rights, priority rights or no rights over each other. For example, if the device supports priorities 0 to 3, the configuration can be as exemplified in the table below.

|   | 0 | 1 | 2 | 3 |
|---|---|---|---|---|
| 0 | No | Preemptive | Preemptive | Preemptive |
| 1 | No | No | Priority | Priority |

|   | 0 | 1 | 2 | 3 |
|---|---|---|---|---|
| 2 | No | No | No | Priority |
| 3 | No | No | No | No |

In this configuration, priority 0 frames can preempt any frames of priority 1 to 3 during transmission. Priority 1 frames has priority rights over any frames of priority 2 to 3. Priority 2 only has priority rights over priority 3 frames. Priority 3 frames have no rights over any other priorities.

If a frame arrives and has priority rights over a frame that is currently being transmitted, the transmission completes before the frame with priority rights is next scheduled for transmission as per existing scheduling algorithms known in the art.

The preempted frame of lower priority is retransmitted in its entirety after the transmission of all higher priority frames, assuming a large enough transmission window exists between two consecutive frames of preemptive rights.

If the preempted frame requires a timestamp (incorporating current time information in the frame) at transmission, the method described herein guarantees accurate time stamping of this frame by applying an updated timestamp each time a complete lower priority frame is re-transmitted after preemption.

Figure 3:
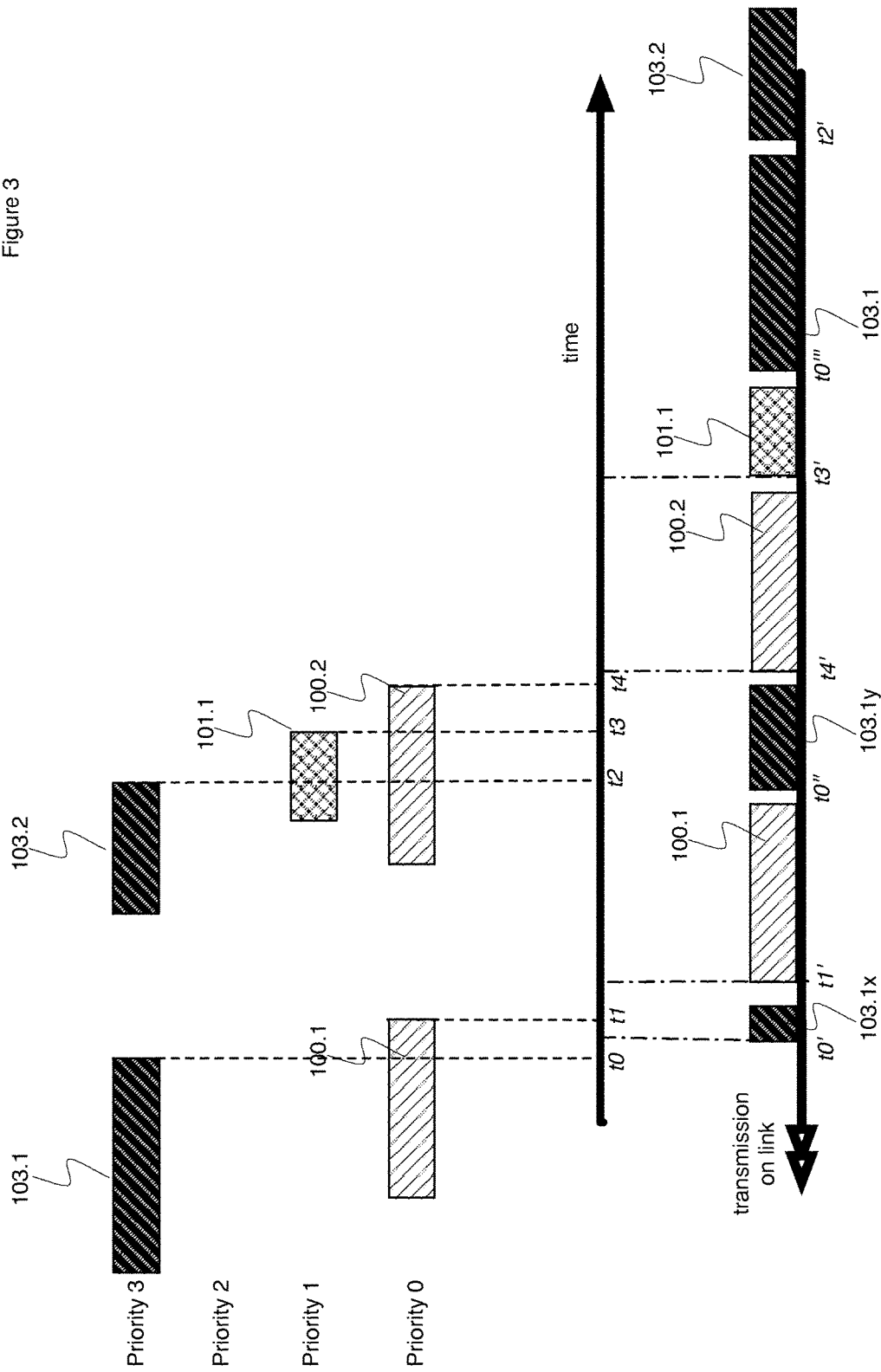
FIG. 3 is an example of an embodiment for preemptive packet transmission.

FIG. 3 shows the same sequence of frame arrival as FIG. 1 but where frames are transmitted with the embodiment described above. In this example, frames of priority 0 has preemptive rights over frames of priority 2 and 3, and frame of priority 1, has priority rights over frames of priority 2 and 3. Frames of different priorities arrive at the queuing system of the network device at random arrival times. The timeline 110 shows the arrival times of the frames. At t0, frame 103.1 of priority 3 arrives, at time t1 a frame of priority 1 100.1 arrives, following at time t2 of frame 103.2 or priority 3. At time t3 a frame 101.1 of priority 1 arrives followed by a frame 100.2 of priority 0 at time t4. Since the link is idle, frame 103.1 is transmitted on the link 120 at time t0', where $\delta=t0'-t0$ is the frame processing time and inter-frame gap requirement, preamble and start of frame delimiter (SFD) transmission etc. Frame 100.1 arrives during the transmission of the frame of priority 3, transmission of frame 103.1x is preempted to transmit frame 100.1 immediately after processing. The time $\alpha=t1'-t1-\delta-\xi$ represents the additional latency applied to the low-latency priority 0 frame which includes the processing time $\delta$ and the time $\xi$ required to preempt the transmission of frame 103.1 and transmit an invalid Frame Check Sequence (FCS). A downstream node receiving the preempted frame with the invalid FCS discards the preempted frame since the FCS check fails. The check is a standard procedure done by all existing nodes, therefore there is no need to replace other nodes in the network to support the embodiment. When the priority 0 frame 100.1 transmission is completed, the transmission of the preempted frame 103.1y restarts from the beginning since no other frames of higher priority have arrived. At time t3, frame of priority 1 101.1 arrives but priority 1 does not have preemptive priority over priority 3, therefore it is queued. When priority 0 frame 100.2 arrives, it preempts the transmission of frame 103.1y again. The priority 0 frame 100.2 is transmitted immediately after preemption and processing delays. Before restarting the transmission of the remainder of the priority 3 frame 103.1, the frame of priority 1 101.1 waiting in queue is scheduled and transmitted. After which the frame 103.1 is transmitted in its entirety, the priority 3 frame 103.2 which arrived at time t2 and now waiting in queue is then transmitted. If priority 3 frames need timestamping, the t0''' timestamp at the beginning of the last transmission of the entire frame will be a correct timestamp.

Figure 4:
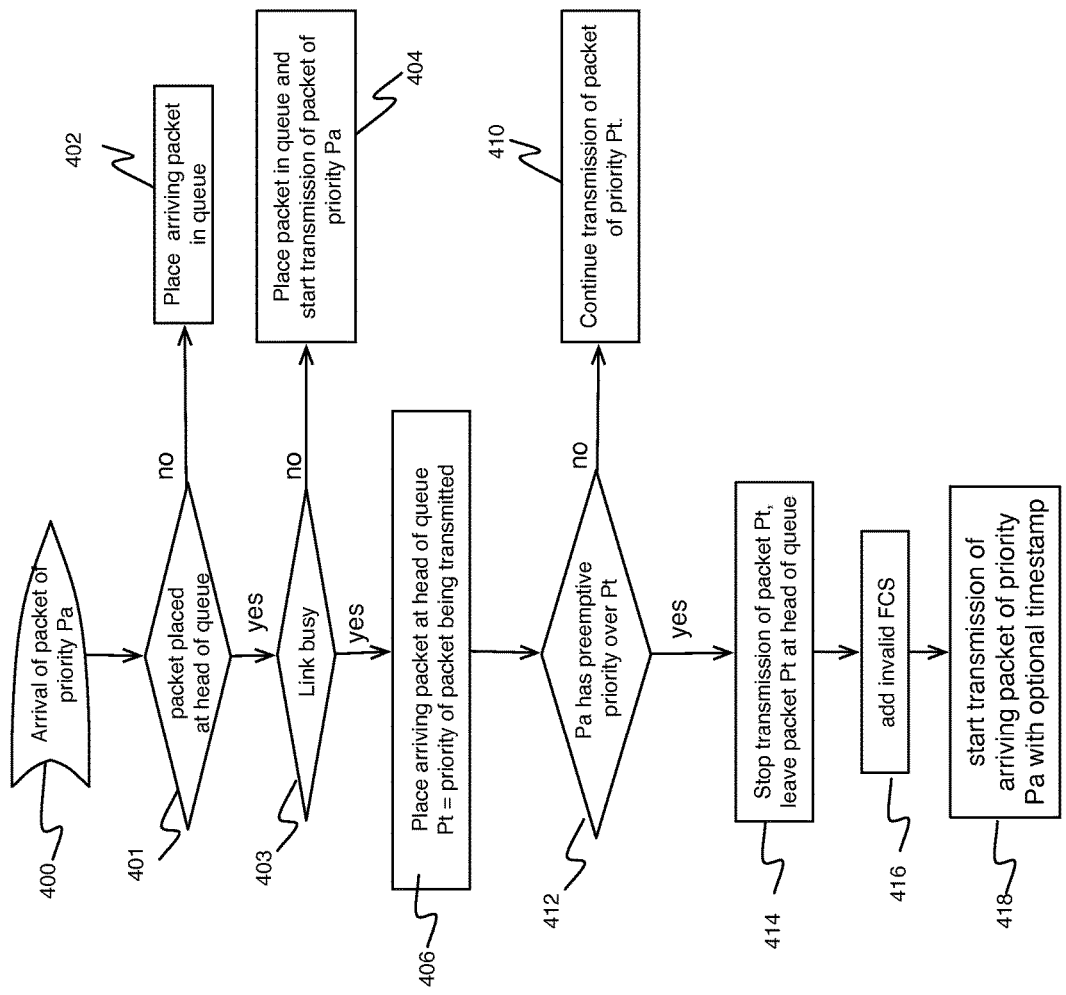
FIG. 4 is an example algorithm implementing preemptive packet transmission.

FIG. 4 provides an example of the embodiment, which can be executed by any existing scheduling algorithm when a packet of priority Pa arrives at the system. If the packet is not placed at the head of the queue for its priority (e.g. the queue is empty for a First-In-First-Out queue) 401 then it is linked in the queue at its appropriate place based on the configured queuing algorithm 402. If the link is not busy 402, the packet is placed at the head of the appropriate queue and transmission of the packet of priority Pa is initiated 404. If the link is busy, the arriving packet is placed at the head of the appropriate queue, and Pt is set to the priority of the packet being transmitted 406. If Pa has no preemptive rights on priority Pt 412, then transmission of the packet of priority Pt continues 410 (and the arriving packet is left in the queue). If Pa has preemptive priority over the packet that is currently being transmitted, the packet transmission is stopped 414, an invalid FCS is transmitted at the end of the packet 416 and transmission of the packet of priority Pa is initiated with an optional current timestamp 418. The entire packet remains in the queue until it is completely transmitted. Therefore if the packet is preempted, the transmission is started again from the beginning.

Statistics can be maintained to count the number of preemptions, transit times etc, and frames can be promoted to higher priorities if the number of preemption is too high.

Another embodiment, after a predetermined amount of preemption, the lower priority frame may be transmitted in its entirety at a higher priority. Thresholds and hysteresis can be used on the statistics to modify the behavior of the system.

The embodiment describe allow to minimize the latency of high priority frames and minimize the variance on the latency. High priority frames latency is a minimum of the processing time $\delta$, if the link is idle and a maximum of $\delta+\xi$ if all lower priority frames can be preempted, in which case the latency is independent of lower priority frame size.

The embodiment described does not need to have devices on both end understanding the fragmentation protocol like the prior art described above. The incomplete frames are simply discarded for failed FCS until the entire frame is completely transmitted.

Second advantage of the embodiment, addresses the lack of support of the prior art for time-stamp dependent protocols. The embodiment described herein re-applies an updated time-stamp every time a preempted frame is retransmitted, thus guaranteeing accurate timing references for protocols that depend on having precise timing information. The embodiment can be implemented over any types of networks at any layers (e.g. layer 2, 3 . . . ).

Figure 5:
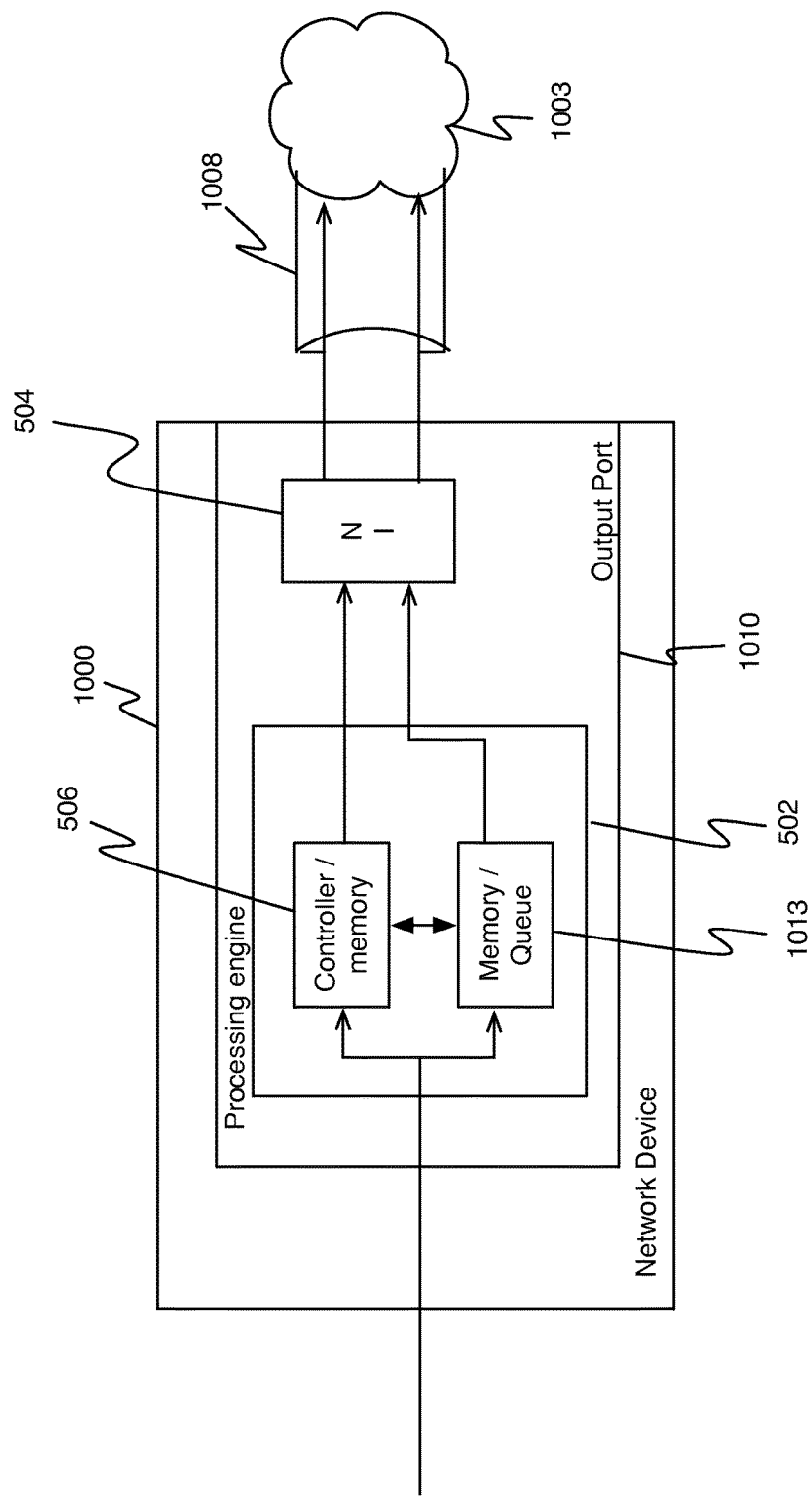
FIG. 5 is an example of a network device.

FIG. 5 shows a generic architecture for a network device 1000 output port 1010 comprising a processing engine 1013 and a Network Interface 504. The Network Interface 504 performs transmission of the frames on the egress link 1008 into the network 1003. The processing engine 1013 comprises a controller 500 executing a preemptive transmission algorithm such as the one described above (FIG. 4). The controller 500 also executes queuing, congestion control and scheduling algorithms known in the art. The algorithm is embedded as executable software or firmware in memory. The controller 500 is coupled to a memory, which implements the queuing system 1013. When a frame arrives in the output port, the controller is notified and places it in the queuing system as per the preemptive algorithm and triggers queuing, immediate transmission and/or preemption as described above.

It should be understood by someone skilled in the art that the preemptive algorithm can be tied independently to any queuing systems in a network device, although described herein as implemented in an output port. Some network devices implement queuing on the ingress port or at various stages in the network device architecture. The preemptive algorithm can be optionally implemented at all or some of the queuing points in the device.

As discussed above, solution disclosed in patent application US 2011/0261814, lacks to support time-stamp dependent protocols.

However, although the scheme disclosed in US 2011/0261814 does not specify any fragment header format (encoding and size), the fragment header allows for addition of information fields (e.g. in TLV format or field presence flag). In another embodiment, these fields are used to enhance the prior art scheme in order to include support for timestamp accuracy requirement. In the embodiment, a new field is added to the fragmentation header of the last fragment's where timing adjustment can be embedded. The format of the adjustment depends on the type of timestamp used in the original transmitted frame. In general, two pieces of information are used: an offset, in bits, from beginning of reconstructed frame (or from beginning of payload) for locating timestamp position to be adjusted and a field containing the adjustment value.

For example, a Network Time Protocol (NTP) frame requires a fraction of seconds adjustment whereas a Precise Time Protocol (PTP) frame requires a nanosecond adjustment, with both of these protocols carrying the timestamp at different offset. The terminating node uses the timing adjustment information, in the last fragment, to adjust the timestamp information in the reconstructed frame giving a more accurate information to the receiver as to the time the entire frame was transmitted as opposed to the time only the first segment was transmitted.

As another embodiment, when a frame has been fragmented and is awaiting longer than a predetermined time. The entire frame is retransmitted at a higher priority but lower priority than the preemptive priority.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

Certain inventive aspects may be appreciated from the foregoing disclosure, of which the following are various examples.

Example 1. A method to reduce latency of frames through a network device supporting a plurality of priorities, the method comprising: configuring one or more of said plurality of priorities with a preemptive right over other one or more of said plurality of priorities; receiving frames in a sequence, each of the frames having a frame priority comprising of one of said plurality of priorities; queuing the received frames in a predetermined order based on a frame arrival time and the frame priority; transmitting a current frame based on a current frame priority and current frame arrival time; stopping transmission of the current frame when a later frame in the sequence is received that has a later frame priority with preemptive right over the current frame priority; transmitting an invalid frame check sequence; transmitting the later frame; and restarting the transmission of the current frame after transmitting the later frame.

Example 2. The method of Example 1 further comprising ordering the transmission of the frames based at least in part on the sequence prior to stopping the transmission.

Example 3. The method of Examples 1-2 wherein restarting the transmission of the current frame after transmitting the later frame comprises restarting the transmission of the current frame when there are no other later frames awaiting transmission having the frame priority higher than that of the current frame.

Example 4. The method of Examples 1-3 further comprising monitoring for later frames in the sequence having a preemptive right over the frame priority of the current frame.

Example 5. The method of Examples 1-4 wherein transmitting the invalid frame check sequence comprises transmitting the invalid frame check sequence in response to detecting the later frame with the later frame priority having preemptive right over the current frame.

Example 6. The method of Examples 1-5 further comprising, after stopping the transmission of the current frame, retaining the current frame in queue.

Example 7. The method of Examples 1-6 further comprising, after completing the transmission of the current frame, deleting the current frame from the queue.

Example 8. A network device comprising: a network interface that receives frames in a sequence each having any one of a plurality of priorities, one or more of said priorities having preemptive right over other of said plurality of priorities, and transmits the frames to a downstream network device; and a controller operatively coupled with the network interface that stops transmission of a current frame in the sequence when a later frame in the sequence is received that has a priority with preemptive right over the current frame, instructs the network interface to transmit an invalid frame check sequence, instructs the interface to transmit the later frame, and instructs the network interface to restart the transmission of the current frame after transmitting the later frame.

Example 9. The network device of Example 8 wherein the controller orders the transmission of the frames based at least in part on the sequence prior to stopping the transmission.

Example 10. The network device of Examples 9-8 wherein the controller restarts the transmission of the current frame after transmitting the later frame when there are no other later frames awaiting transmission having preemptive right over the current frame.

Example 11. The network device of Examples 8-10 wherein the controller monitors for later frames in the sequence having a preemptive right over the current frame.

Example 12. The network device of Examples 8-11 wherein the controller instructs the network interface to transmit the invalid frame check sequence in response to detecting the later frame with preemptive right over the current frame.

Example 13. The network device of Examples 8-12 wherein the controller maintains the current frame in the queue until the current frame is completely transmitted.

Example 14. The network device of Examples 8-13 wherein the controller removes the current frame from the queue after it is completely transmitted.

Example 15. A system comprising: an upstream network device that receives frames in a sequence each having any one of a plurality of priorities, one or more of said priorities having preemptive right over other of said plurality of priorities, transmits the frames, stops transmission of a current frame in the sequence when a later frame in the sequence is received that has a later frame priority with preemptive right over the current frame, transmits an invalid frame check sequence, transmits the later frame, and restarts the transmission of the earlier frame after transmitting the later frame; and a downstream network device that receives the frames and the invalid frame check sequence.

Example 16. The system of Example 15 wherein the upstream network device orders the transmission of the frames based at least in part on the sequence prior to stopping the transmission.

Example 17. The system of Examples 15-16 wherein the upstream network device restarts the transmission of the current frame after transmitting the later frame when there are no other later frames awaiting transmission having a frame priority with preemptive right over the current frame.

Example 18. The system of Examples 15-17 wherein the upstream network device monitors for later frames in the sequence having a frame priority with preemptive right over the current frame.

Example 19. The system of Examples 15-18 wherein the upstream network device transmits the invalid frame check sequence in response to detecting the later frame having a frame priority with preemptive right over the current frame.

Example 20. The system of Examples 15-19 wherein the upstream network device retains the current frame in queue and, when restarting the transmission of the current frame, restarts the transmission of all bits of the current frame.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method to reduce latency of frames through a network device supporting a plurality of frame priorities, the method comprising:
    configuring said plurality of frame priorities, wherein each frame priority of said plurality of priorities specifies a preemptive right, a priority right or no right over each of the other frame priorities of said plurality of priorities;
    receiving frames in a sequence, wherein each of the frames is associated with a frame priority comprising of one of said plurality of frame priorities;
    queuing each of the received frames in a predetermined order based on a frame arrival time and the frame priority associated with the received frame;
    transmitting a current frame;
    stopping transmission of the current frame when a later frame in the sequence is received that is associated with a frame priority specifying a preemptive right over the frame priority associated with the current frame;
    transmitting an invalid frame check sequence;
    transmitting the later frame; and
    restarting the transmission of the current frame after transmitting the later frame.

2. The method of claim 1 further comprising ordering the transmission of the frames based at least in part on the sequence prior to stopping the transmission.

3. The method of claim 1 wherein restarting the transmission of the current frame after transmitting the later frame comprises restarting the transmission of the current frame when there are no other later frames awaiting transmission associated with a frame priority specifying a priority right over the frame priority associated with the current frame.

4. The method of claim 1 further comprising monitoring for later frames in the sequence associated with a frame priority that specifies a preemptive right over the frame priority associated with the current frame.

5. The method of claim 4 wherein transmitting the invalid frame check sequence comprises transmitting the invalid frame check sequence in response to detecting the later frame associated with the frame priority having preemptive right over the current frame.

6. The method of claim 1 further comprising, after stopping the transmission of the current frame, retaining the current frame in queue.

7. The method of claim 1 further comprising, after completing the transmission of the current frame, deleting the current frame from the queue.

8. A network device comprising:
    a network interface that receives frames in a sequence, wherein each frame is associated with a frame priority of a plurality of frame priorities, and each frame priority of said plurality of frame priorities specifies a preemptive right, a priority right or no right over each of the other frame priorities of said plurality of frame priorities, and transmits the frames to a downstream network device;

a controller operatively coupled with the network interface that stops transmission of a current frame in the sequence when a later frame in the sequence is received that is associated with a frame priority that specifies a preemptive right over a frame priority associated with the current frame, instructs the network interface to transmit an invalid frame check sequence, instructs the network interface to transmit the later frame, and instructs the network interface to restart the transmission of the current frame after transmitting the later frame.

9. The network device of claim 8 wherein the controller orders the transmission of the frames based at least in part on the sequence prior to stopping the transmission.

10. The network device of claim 8 wherein the controller restarts the transmission of the current frame after transmitting the later frame when there are no other later frames awaiting transmission associated with a frame priority that specifies a preemptive right over the frame priority associated with the current frame.

11. The network device of claim 8 wherein the controller monitors for later frames in the sequence associated with a frame priority that specifies a preemptive right over the frame priority associated with the current frame.

12. The network device of claim 11 wherein the controller instructs the network interface to transmit the invalid frame check sequence in response to detecting the later frame associated with the frame priority that specifies a preemptive right over the frame priority associated with current frame.

13. The network device of claim 8 wherein the controller maintains the current frame in the queue until the current frame is completely transmitted.

14. The network device of claim 8 wherein the controller removes the current frame from the queue after it is completely transmitted.

15. The network device of claim 8 wherein the upstream network device retains the current frame in queue and, when restarting the transmission of the current frame, restarts the transmission of all bits of the current frame.

16. A system comprising:
an upstream network device that receives frames in a sequence, wherein each frame is associated a frame priority of a plurality of frame priorities, and each frame priority of said plurality of frame priorities specifies a preemptive right, a priority right or no right over each of the other frame priorities of said plurality of frame priorities, transmits the frames, stops transmission of a current frame in the sequence when a later frame in the sequence is received that is associated with a frame priority with preemptive right over a frame priority associated with the current frame, transmits an invalid frame check sequence, transmits the later frame, and restarts the transmission of the earlier frame after transmitting the later frame; and
a downstream network device that receives the frames and the invalid frame check sequence.

17. The system of claim 16 wherein the upstream network device orders the transmission of the frames based at least in part on the sequence prior to stopping the transmission.

18. The system of claim 16 wherein the upstream network device restarts the transmission of the current frame after transmitting the later frame when there are no other later frames awaiting transmission that are associated with a frame priority with preemptive right over the frame priority associated with the current frame.

19. The system of claim 16 wherein the upstream network device monitors for later frames in the sequence associated with a frame priority with preemptive right over the frame priority associated with the current frame.

20. The system of claim 19 wherein the upstream network device transmits the invalid frame check sequence in response to detecting the later frame associated with the frame priority with preemptive right over the frame priority associated with the current frame.

* * * * *